US006570525B2

(12) United States Patent
Esposito et al.

(10) Patent No.: US 6,570,525 B2
(45) Date of Patent: May 27, 2003

(54) METHOD AND DEVICE FOR THE ENCODING AND DECODING OF POWER DISTRIBUTION AT THE OUTPUTS OF A SYSTEM

(75) Inventors: Pierre Esposito, Montreau (FR); Patrick Quemin, Jouy le Moutier (FR); Olivier Ruffenach, Poissy (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/925,535

(22) Filed: Aug. 10, 2001

(65) Prior Publication Data

US 2002/0041250 A1 Apr. 11, 2002

(30) Foreign Application Priority Data

Aug. 11, 2000 (FR) .......................................... 00 10585

(51) Int. Cl.[7] ......................... G01S 13/78; G01S 13/00; H01Q 15/00

(52) U.S. Cl. ............................... 342/45; 342/6; 342/51; 342/194

(58) Field of Search ........................... 342/45, 51, 194, 342/6

(56) References Cited

U.S. PATENT DOCUMENTS 3,885,089 A * 5/1975 Callais et al.
4,215,366 A * 7/1980 Davidson
5,014,061 A * 5/1991 Ghose ......................... 342/45
5,146,190 A 9/1992 Firmain
5,677,694 A 10/1997 Chevalier et al.
5,920,277 A 7/1999 Foster et al.
2002/0014986 A1 * 2/2002 Ringwald et al. ............. 342/30

OTHER PUBLICATIONS

R.J. Niemeijer, "The Electrically Switched Polariser", Delft University Press, 1996, Delft XP–002167260, Ch. 4, Paragraph 4.3.3, pp. 94–95.

* cited by examiner

*Primary Examiner*—Stephen C. Buczinski
(74) *Attorney, Agent, or Firm*—Oblon, Spivak, McClelland, Maier & Neustadt, P.C.

(57) ABSTRACT

In a method and device for the encoding/decoding of power distribution at outputs of a system, a distribution encoder includes an element that receives a useful input signal and a piece of distribution information, and that superposes the piece of distribution information received on the input signal. The piece of information is used for the subsequent distribution of the total power of the input signal at an output or outputs of the system. A distribution decoder includes one or more inputs that receive an encoded signal or an encoded signal divided into several signals including the useful signal and the piece of distribution information. Further, one or more outputs are connected to the outputs of the system to which the useful signal is transmitted by distributing the total power received according to the piece of distribution information. The method and device enable, for example, fast, low-power switching of the outputs of a high-power system and the programming of a system with variable power outputs.

21 Claims, 2 Drawing Sheets

METHOD AND DEVICE FOR THE ENCODING AND DECODING OF POWER DISTRIBUTION AT THE OUTPUTS OF A SYSTEM

BACKGROUND OF THE INVENTION

1. Field of the Invention

The invention relates to a method and device for the encoding/decoding of the power distribution at the outputs of a system. A possible application of the invention is the making of high-power transmitters such as for example those used by interrogators known as IFF (identification friend or foe) interrogators, using secondary radars.

2. Description of the Prior Art

FIG. 1 shows that the current transmission chain used in IFF transmitter structures is constituted by the following elements in the following order: a driver 1, a two-channel power divider 2, a two-channel parallel amplification device 3 having an amplifier 3' and 3" on each channel, a two-channel recombination device 4, a circulator 5, a two-channel switching device $\mathbf{6}_v$ formed by PIN diodes and a transmission device 7 formed by two transmission antennas, one sum antenna Σ and one difference antenna Δ. A switching command o(t) is applied to the signal s(t) through the output switching device $\mathbf{6}_v$.

As can be seen in FIG. 2, the interrogation signal s(t) of an IFF transmitter has three pulses, the first and last pulse being sent by the antenna Σ and the mid-pulse being sent by the antenna Δ. In order to meet the requirements of the IFF ISLS (identification friend or foe interrogation side lobe suppression) specifications, the antenna switching between the transmission of the second gate of the interrogation signal s(t) and that of the third gate must be fast, i.e. it must be done in about some hundreds of nanoseconds (<200 ns).

It is difficult and even impossible to implement an architecture of this kind for making fast (<200 ns) power switches with a peak power of over 2 kW. Indeed, the transmission chain presently used in the making of high-power transmitters has a power switch $\mathbf{6}_v$ with a relatively low switching speed (with a switching time of about 1 μs). This low switching speed is actually due to the fact that it is sought to have high-power transmitters. This is because the voltage handling capability of the PIN diodes of the switch is proportional to the thickness of their intrinsic region whereas their switching speed, which is related to the lifetime of the minority carriers, is inversely proportional to this thickness. Furthermore, the standard structure of IFF transmitters dictates the use of a circulator 5 between the amplification device 3 and the switch $\mathbf{6}_v$ owing to an infinite standing wave ratio (SWR) which entails the use of PIN diodes having a voltage handling capability that is twice the maximum value. This means that the switching speed is further reduced.

SUMMARY OF THE INVENTION

To overcome this drawback, the present invention, instead of using a switch placed downline, uses a low-power distribution encoder, placed upline with respect to the amplification, and a distribution decoder for the selection switching of the output channels.

To this end, an object of the invention is a method for the encoding of distribution comprising a step for the superposing, on a signal s(t), of a piece of distribution information i(t) used for the subsequent distribution of the total power $P_s$ of said signal s(t), appearing at output of a system Γ, to one or more outputs $\{S_\Gamma\}$ of said system Γ.

This method is used by the distribution encoder comprising an element which:

- receives a signal s(t),
- receives a piece of distribution information i(t) used for the subsequent distribution of the total power $P_s$ of said signal s(t) on said output or outputs $\{S_\Gamma\}$ of a system Γ, and
- superposes said piece of received distribution information i(t) on said received signal s(t).

In order to decode the distribution information, the invention also proposes a distribution decoding method comprising at least the following steps:

- the reception of an encoded signal c(t) or a divided encoder signal $(c_j(t))_{j\in[1,2N]}$ comprising a useful signal s(t) and a piece of distribution information i(t),
- the sending of said signal s(t) to each of the outputs $\{S_\Gamma\}$ of a system Γ in distributing the total power $P_s$ received at said outputs $\{S_\Gamma\}$ depending on said distribution information i(t).

This method is used by the distribution encoder comprising:

- one or more inputs at which there is received an encoded signal c(t) or a divided encoded signal $(c_j(t))_{j\in[1,2N]}$ comprising a useful signal s(t) and a piece of distribution information i(t) identically or differently for each signal,
- several outputs connected to the outputs $\{S_\Gamma\}$ of a system Γ on which said signal s(t) is sent in distributing the total power received $P_s$ depending on said piece of distribution information i(t).

The invention also proposes a transmission chain comprising at least the distribution encoder and the distribution decoder described here above.

The architecture thus obtained enables the switching of the power output by improving the following parameters:

- the switching speed: the switching is done in less than 300 nanoseconds;
- the power handling capability of the switching function; and
- the standing wave ratio (SWR) capability of the switching function which becomes infinite.

This architecture also optimizes the power balance of a transmission chain by masking the switching function losses.

Furthermore, this architecture is less complex because it enables the use of components with standard specifications commonly used in the semiconductor industry.

BRIEF DESCRIPTION OF THE DRAWINGS

Other features and advantages of the invention shall appear more clearly from the following description given by way of an example with reference to the appended figures, of which.

MORE DETAILED DESCRIPTION

Figure 1:
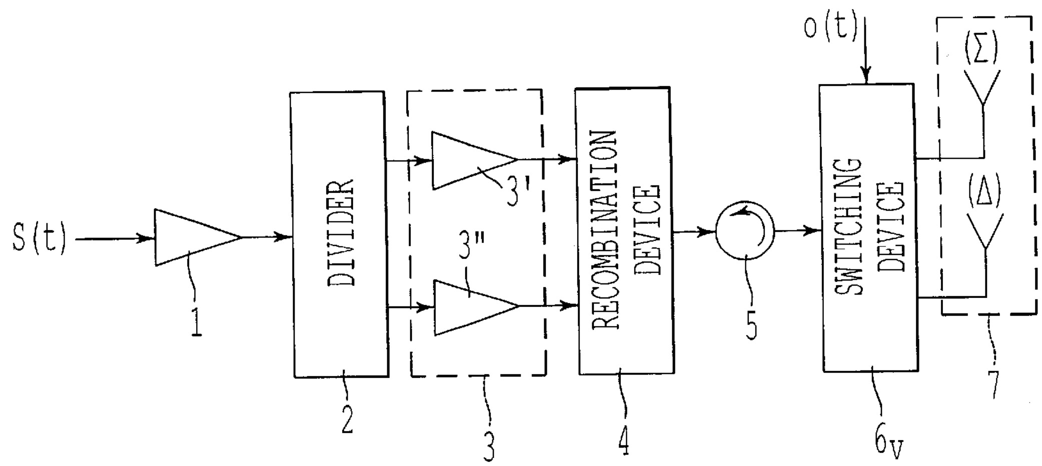
FIG. 1 shows an embodiment of the transmission chain with a power switch $\mathbf{6}_v$ placed downline according to the prior art.
Figure 2:
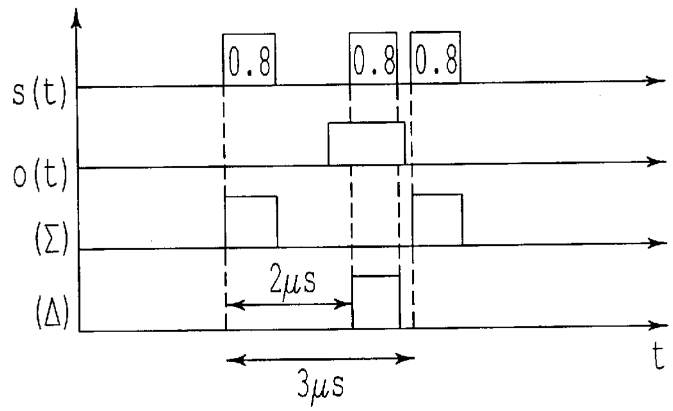
FIG. 2 shows a graph of the incoming and outgoing signals of the transmission chain according to the prior art, FIG. 3(*a*) shows a distribution encoder 8 according to the invention, FIG. 3(*b*) shows a variant of the distribution encoder 8 according to the invention.
Figure 3A:
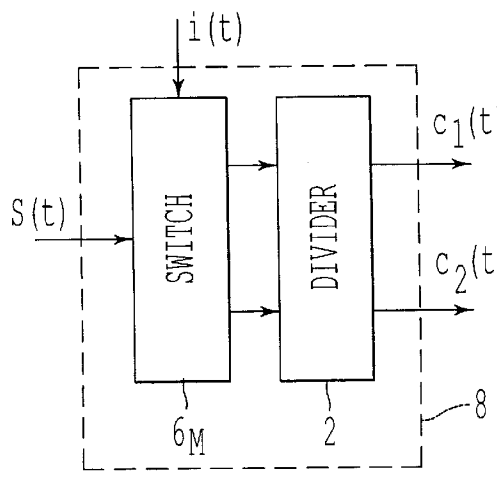
Figure 3B:
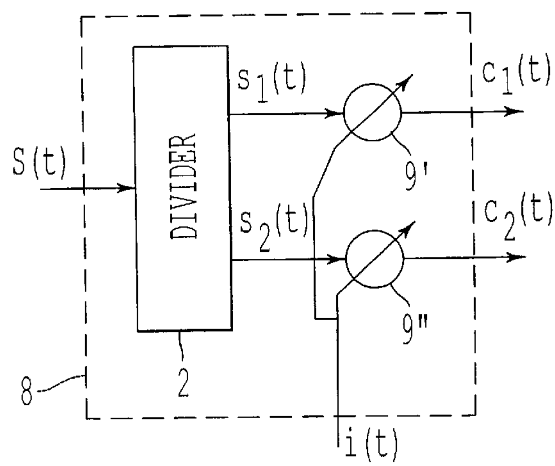

FIG. 3(*a*) shows an exemplary embodiment of a distribution encoder 8 according to the invention. This distribution encoder 8 has a switch $\mathbf{6}_M$ that receives a signal s(t) and a piece of distribution information element used to select one or more inputs of the divider 2. The divider 2, as its name indicates, divides the signal s(t) into two signals $s_1(t)$ and $s_2(t)$. The selection of one of the two inputs of the divider 2 by the switch $\mathbf{6}_M$ enables the piece of distribution information i(t) to be superposed on the signals $s_1(t)$ and $s_2(t)$. This superposing of this piece of distribution information i(t) on the signals $s_1(t)$ and $s_2(t)$ is done for example by means of a differential phase modulation between the parallel channels at output of the divider 2. The power division can then be carried out by a 3 dB/90° coupler whose properties are such that the piece of distribution information i(t) is superposed on the signal as described here above. The signals c1(*t*) and c2(*t*) resulting from this differential phase modulation comprise the signal s(t) divided in power, namely s1(*t*) and s2(*t*) which are respectively phase-shifted or not phase-shifted by 90°, depending on the input of the divider 2 at which the signal s(t) arrives, namely depending on the value of i(t).

$$c_j(t)=f_j(s_j(t),i(t)) \text{ with } j\epsilon[1,2N]$$

FIG. 3(*b*) shows a variant of this distribution encoder 8 according to the invention. The distribution encoder 8 has a divider 2 which receives a signal s(t) and divides it into two signals $s_1(t)$ and $s_2(t)$. It is two 0°/90° phase shifters 9' and 9" positioned on both output channels of the divider 2 that receive the distribution information i(t) and get positioned on the value 0° or 9° for the phase-shifter 9' and conversely on the value 90° or 0° for the phase-shifter 9", depending on this information i(t). The resulting signals c1(*t*) and c2(*t*) are said to be differentially phase-modulated.

$$c_j(t)=g_{\theta j}(s_j(t),i(t)) \text{ with } j\epsilon[1,2N] \textit{ and } \theta_j\epsilon[0°,90°]$$

The power divider 2 used in this case may be a 3 dB/90° coupler or a Wilkinson coupler for example. The divider 2 shown in the FIG. 3(*b*) is a Wilkinson coupler. If the divider 2 is a 3 dB/90° coupler, its second input is connected to a load which may be a 50-ohm load for example. However, the encoder 8 works whatever the value of this load.

The superposed distribution information i(t) thereafter enables the distribution of the total power $P_s$ that arrives at the output of the system Γ on one or more outputs $\{S_\Gamma\}$ of said system Γ so that the signal s(t) is sent on. This distribution information i(t) may vary continuously or discontinuously in time. The phase shifters for example may vary continuously between 0° and 90° (included) and conversely according to the value of i(t). For, the distribution information i(t) may indicate for example:

that the totality of the power $P_s$ must be sent on to a single output $S_\Gamma$ at a given instant t, or the proportion of the power $P_s$ to be sent on to each output $S_\Gamma$ at a given instant t.

The above examples of the distribution encoder 8 are not restrictive. The divider 2 may comprise one or 2 to 2N outputs (N∈ℵ*). The values of the angle $\theta_j$ are not restricted to 0° and 90° or even to the interval [0°, 90°]. The functions fj or $g_{\theta_j}$ may be identical on one or more channels or they may be all distinct. The superposing of the distribution information i(t) on the signal s(t) is not limited to the differential phase modulation. This superposing of the distribution information i(t) on the signal s(t) may be done by any continuous or discontinuous function using or not using a divider 2.

Figure 4:
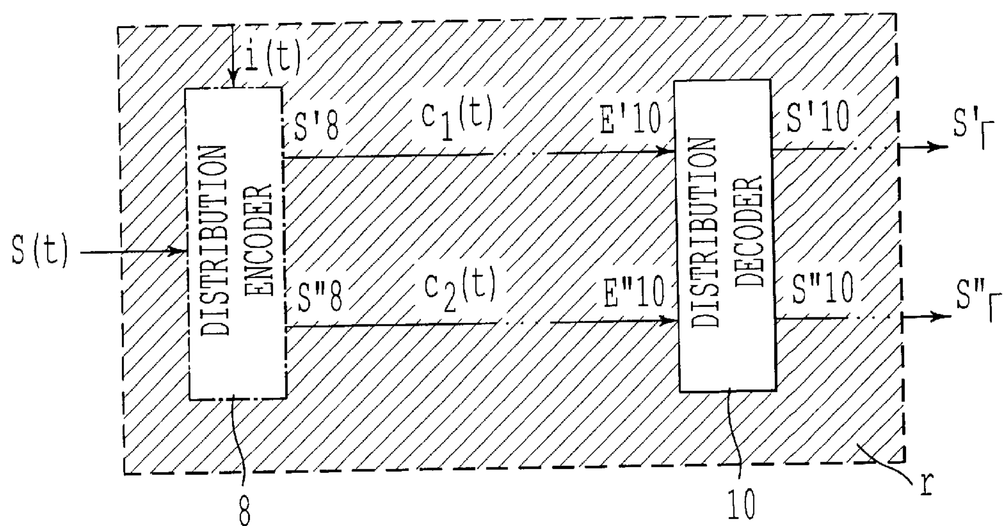
FIG. 4 shows a system Γ comprising a distribution encoder 8 and a distribution decoder 10 according to the invention.

FIG. 4 shows an exemplary system Γ according to the invention. The distribution encoder 8 has two output channels directly or indirectly connected to the two inputs of the distribution decoder 10. If the distribution information i(t) has differentially phase-modulated the two channels at output of the distribution encoder 8, the distribution decoder 10 performs a demodulation. This demodulation is physically expressed by obtaining the sum of the power values present at the two input channels $E'_{10}$ and $E''_{10}$ of the distribution decoder 10 on either of its outputs $S'_{10}$ and $S''_{10}$ depending on the phase states on the inputs $E'_{10}$ and $E''_{10}$. The distribution decoder 10 comprises for example a 3 dB/90° coupler that demodulates the distribution information i(t). The distribution decoder generally comprises a 3 dB/n° coupler with n as an integer (3 dB/90°, 3 dB/180°, 3 dB/45°, . . . ). The phase distribution properties of 3 dB/90° couplers are known in the prior art [Anaren, RF & Microwave Components-Reference: M 1951–79, February 1997].

In general, the distribution decoder 10 receives one or more signals comprising the useful signal s(t) and the distribution information i(t). The signals received by the decoder 10 correspond to the signals sent by the encoder 8 which may or may not have undergone one or more intermediate processing operations. The distribution decoder 10 decodes and uses the distribution information i(t) to send the useful signal s(t) to one or more of the outputs $\{S_\Gamma\}$ of the system Γ. It does so in distributing, depending on the decoded distribution information i(t), the total power $P_s$ entering the decoder 10 at the outputs $S'_{10}$ and $S''_{10}$ of the decoder 10, each being connected to an output, $S'_\Gamma$ and $S''_\Gamma$ respectively of the system Γ.

$$\sum_{j\in[1,2N]} P_{E^j_{10}} = P_s = \sum_{1\in[1,L]} P_{S^1_{10}}$$

Since the number of output channels of the distribution encoder 8 is identical to the number of input channels of the distribution decoder 10, the number of input channels of the distribution decoder 10 is 1 or 2 to 2N (N∈ℵ*). The number L of outputs of the distribution decoder 10 for its part is identical to that of the system Γ and is not limited (L∈ℵ*).

Figure 5:
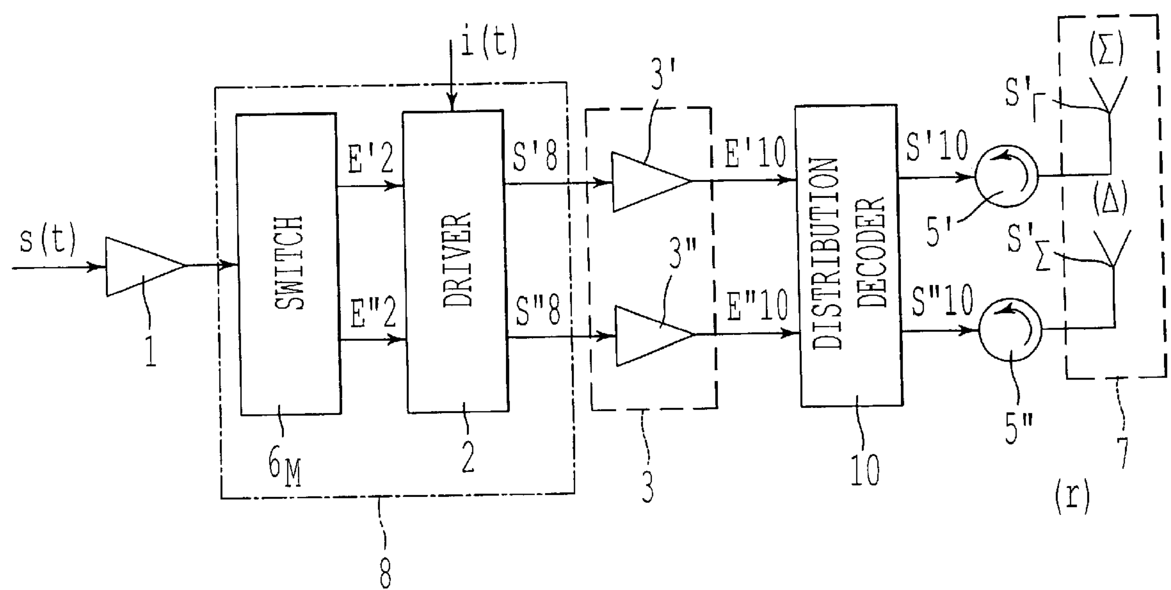
FIG. 5 shows an exemplary embodiment of a system according to the invention, namely an IFF transmission chain.

FIG. 5 gives an exemplary view of a system Γ according to the invention: an IFF transmission chain. The driver 1 is followed by the distribution encoder 8 comprising for example a switch and a two-channel divider 2 (3 dB/90° coupler for example), an amplifier 3' and 3" on each of the two channels constituted by a high-power double transistor and then a distribution decoder 10. The driver 1 is constituted by a pulsed 500 watts C class RF transistor (with a load rate of 1%) working at 1030 MHz. The switch $\mathbf{6}_M$ may be of the SPDT (single-pole double-throw) type. It then uses the principle of serial PIN diode switching or the system based on λ/4 lines switched by PIN diodes whose unused output is coupled simultaneously to a resistance (50 Ohms for example). The input couplers used by the divider 2 of the distribution encoder 8 are one of the following types: 3 dB/90° hybrid ring etched on substrate, "ANAREN"

(trademark) 3 dB/90° microstrip couplers; "SAGE labs" (trademark) 3 dB/90° coaxial couplers, etc. The output coupler of the distribution decoder 10 is a 3 dB/90° coupler among the types referred to here above. A circulator 5', 5" respectively is placed at the output $S'_{10}$ and $S''_{10}$ respectively of the distribution decoder 10. The circulator 5' and 5" are identical to those conventionally used in the IFF transmission chain. The transmission chain is terminated by a transmission device 7 comprising an antenna on each output channel of the distribution decoder 10 (an antenna Σ and an antenna Δ in the case of the IFF transistors).

It being known that the approximate magnitude of the power of the signal s(t) at output of the driver is 250 to 700 W, let us consider the following example in which the power of the signal s(t) observed at output of the driver 2 is 500 W. At output of the switch $6_M$, the power obtained is about 57 dBm with a decoupling greater than 30 dB between the two outputs $E'_2$ and $E''_2$. At output of the power divider 2, whatever the input used, $E'_2$ or $E''_2$, power of 54 dBm±0.3 dB is obtained at each of the outputs $S'_8$ and $S''_8$ with a phase shift of 0°±2° or 90°±2° depending on the selected input.

The amplification device 3 consists of two transistors 3' and 3" in parallel giving 61 dBm±0.5 dB at output with 54 dBm at input and having a return loss of more than 15 dB at the input of each transistor. The difference between these two channels is adjusted by the setting of a variable tuning capacitor at the output of each transistor. The phase matching of the two channels thus obtained is less than 5°.

At output of the distribution decoder 10, power of 63.5 dBm±0.5 dBm is obtained at the outputs $S'_{10}$ or $S''_{10}$ with a decoupling of more than 20 dB between the two outputs.

The results of this example are validated between −40° C. and +70° C. A ±1 dB variation with respect to the nominal output power was observed.

This invention can be applied to radiofrequency (RF) transmitters having a parallel structure final power stage. However, it is not limited to radiofrequency transmitters because it can also be applied to microwave (HF) transmitters or to millimeter wave transmitters. More generally, the invention can be applied to any device requiring power switching at the outputs, for example for a space-diversity transmitter/receiver (T/R) but also to any device with variable power outputs.

What is claimed is:

1. A method of distribution encoding comprising:

receiving an input signal;

superposing, on the received input signal, a piece of distribution information used for subsequent distribution of a total power of the input signal to one or more outputs of a system when the input signal with the superposed piece of distribution information appears at the one or more outputs of the system, wherein the superposed piece of distribution information indicates a proportion of power to be sent to each of the one or more outputs; and supplying the input signal with the superposed piece of distribution information to the system.

2. A distribution encoding method according to claim 1, further comprising dividing the input signal into 2N signals on 2N respective channels, the dividing preceding, including, or following the superposing.

3. A distribution encoding method according to claim 1, wherein the superposing comprises a differential phase modulation of channels.

4. A distribution encoding method according to claim 2, wherein the dividing comprises:

receiving the input signal;

receiving the piece of distribution information;

dividing the received input signal into the 2N signals;

superposing the distribution information on the 2N divided input signals identically or differently; and encoded the 2N divided input signals with the superposed piece of distribution information.

5. A distribution encoding method according to claim 4, further comprising a switching including:

receiving the input signal;

receiving the piece of distribution information;

choosing one of the 2N divided input signals depending on the piece of distribution information; and transmitting the chosen divided input signal to the system.

6. A distribution encoding method according to claim 2, further comprising phase-shifting preceded by the dividing, the phase-shifting comprising:

receiving the 2N divided input signals on each of the 2N channels;

receiving the piece of distribution information;

phase-shifting the 2N divided input signals of each of the 2N channels identically or differently depending on the piece of distribution information; and sending, on each of the 2N channels, signals resulting from the phase shift.

7. A distribution encoder comprising:

an input device configured to receive an input signal;

a circuit device configured to superpose, on the input signal, a piece of distribution information used for subsequent distribution of a total power of the input signal to one or more outputs of a system when the input signal with the superposed piece of distribution information appears at the one or more outputs of the system, wherein the superposed piece of distribution information indicates a proportion of power to be sent to each of the one or more outputs; and an output configured to output the input signal with the superposed piece of distribution information to the system.

8. A distribution encoder according to claim 7, further comprising a power divider configured to divide the input signal into 2N signals on 2N respective channels, the power divider being placed before or after the circuit device configured to superpose.

9. A distribution encoder according to claim 8, wherein the circuit device configured to superpose includes a differential phase modulator of the 2N channels of the divider that have undergone or not undergone intermediate processing.

10. A distribution encoder according to claim 8, wherein the power divider receives the input signal and the piece of distribution information, superposes the piece of distribution information on the divided signals identically or differently, and sends encoded signals obtained by the superposing.

11. A distribution encoder of an output according to claim 10, further comprising a switch comprising:

a first input receiving the divided 2N input signals;

a second input receiving the piece of distribution information;

plural outputs, each output being connected to an input of the divider, one of the outputs outputting the divided input signals with the superposed piece of distribution information;

a device connecting the input of the switch receiving the divided 2N input signals to an output of the switch sending on the 2N divided input signals.

12. A distribution encoder according to claim 11, wherein:

the switch includes a PIN diode SPDT (single-pole double-throw) switch with a resistance on the unused output; and the divider includes a 3 dB/90° coupler.

13. A distribution encoder according to claim 8, further comprising a phase-shift device comprising, on each of the 2N channels at an output of the divider, a phase-shifter configured to receive the 2N divided input signals, to receive the piece of distribution information, to phase-shift the 2N divided signals as a function of the piece of distribution information, each of the 2N channels being shifted identically or differently, and to send, on each of the 2N channels, the encoded signal resulting from the phase shift.

14. A distribution encoder according to claim 13, wherein each phase-shifter includes an all-or-nothing 0°/90° phase-shifter or continuously or discontinuously varying phase-shifters.

15. A distribution decoding method comprising:

receiving an input encoded signal or an input divided encoded signal including an input signal superposed with a piece of distribution information, wherein the superposed piece of distribution information indicates a proportion of power to be sent to each of outputs of a system;

transmitting the input encoded signal or the input divided encoded signal to each of the outputs of the system by proportionately distributing a total power received to the outputs based on the piece of distribution information superposed on the input encoded signal or the input divided encoded signal.

16. A distribution decoder comprising:

one or more inputs receiving an input encoded signal or an input divided encoded signal including an input signal superposed with a piece of distribution information identically or differently for each input signal, wherein the superposed piece of distribution information indicates a proportion of power to be sent to each of outputs of a system;

plural outputs connected to the outputs of the system to which the input encoded signal or input divided encoded signal is transmitted by proportionately distributing a total power received depending on the piece of distribution information superposed on the input encoded signal or the input divided encoded signal.

17. A distribution decoder according to claim 16, comprising a 3 dB/90° coupler.

18. A distribution decoder comprising:

one or more inputs receiving an input encoded signal or an input divided encoded signal including an input signal or a divided encoded signal including an input signal phase-shifted by a piece of distribution information, wherein the superposed piece of distribution information indicates a proportion of power to be sent to each of outputs of a system;

plural outputs connected to the outputs of the system on which the input encoded signal or the input divided encoded signal is sent in proportionately distributing a total power received according to a phase state of the received signal or signals, that is generated by the piece of distribution information.

19. A transmission chain comprising:

at least one distribution encoder, including:

an input device configured to receive an input signal;

a circuit device configured to superpose, on the input signal, a piece of distribution information used for subsequent distribution of a total power of the input signal to one or more outputs of a system when the input signal with the superposed piece of distribution information appears at the one or more outputs of the system, wherein the superposed piece of distribution information indicates a proportion of power to be sent to each of the one or more outputs; and an output configured to output the input signal with the superposed piece of received distribution information to the system, and at least one distribution decoder, including:

one or more inputs receiving an input encoded signal or an input divided encoded signal including an input signal superposed with the piece of distribution information identically or differently for each input signal;

plural outputs connected to outputs of a system to which the input encoded signal or input divided encoded signal is transmitted by proportionately distributing the total power received depending on the piece of distribution information superposed on the input encoded signal or the input divided encoded signal.

20. A transmission chain according to claim 19, comprising at least one of the following devices:

a driver, upline from the distribution encoder;

an amplification device comprising an amplifier on each channel between the distribution encoder and the distribution decoder;

a circulator on each channel downline from the distribution decoder; and a transmission device including a transmission antenna on each channel downline from the decoding distributor, each constituting one of the outputs.

21. A transmission chain according to claim 20, wherein:

the driver comprises a radiofrequency or microwave or millimetrical transistor;

each amplifier comprises a high-power transistor; and the transmission device comprises a sum antenna and a difference antenna.

* * * * *